(12) United States Patent
Tateyama et al.

(10) Patent No.: US 6,304,415 B1
(45) Date of Patent: Oct. 16, 2001

(54) MAGNETIC HEAD

(75) Inventors: Kohichi Tateyama, Ichikawa; Hiroaki Yoda, Kawasaki; Tadahiko Kobayashi, Yokohama; Hiromi Sakata, Kawasaki; Michiko Hara, Yokohama; Akio Hori; Takashi Koizumi, both of Kawasaki; Tomohiko Nagata, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/615,783

(22) Filed: Jul. 13, 2000

Related U.S. Application Data

(62) Division of application No. 09/150,926, filed on Sep. 10, 1998, now Pat. No. 6,108,167.

(30) Foreign Application Priority Data

Sep. 10, 1997 (JP) ..................................... 9-245298
Sep. 7, 1998 (JP) .................................. 10-253019

(51) Int. Cl.[7] ............................. G11B 5/31; G11B 5/187
(52) U.S. Cl. ........................................... 360/126; 360/122
(58) Field of Search .................................. 360/119, 120, 360/126, 122

(56) References Cited

U.S. PATENT DOCUMENTS

| | | | |
|---|---|---|---|
| 4,953,051 | * 8/1990 | Wada et al. | .......................... 360/126 |
| 5,270,894 | * 12/1993 | Okada et al. | .......................... 360/126 |
| 5,283,942 | 2/1994 | Chen et al. | . |
| 5,872,693 | 2/1999 | Yoda et al. | . |

* cited by examiner

Primary Examiner—Robert S. Tupper
(74) Attorney, Agent, or Firm—Oblon, Spivak, McClelland, Maier & Neustadt, P.C.

(57) ABSTRACT

At least one magnetic pole out of a pair of magnetic poles is provided with a T-shaped magnetic pole having a magnetic pole chip at the position contacting with a magnetic gap and an auxiliary magnetic pole which is wider than thereof. The proximity of an air bearing surface of the T-shaped magnetic pole is composed of a laminated film containing a magnetic material layer with a high saturated magnetic flux density which composes the magnetic pole chip and a portion of the auxiliary magnetic pole and a magnetic material layer with a low saturated magnetic flux density which composes the remaining portion of the auxiliary magnetic pole. When the front portion of the magnetic pole with the track width of 1.8 $\mu$m or less is composed of a laminated film containing a magnetic material layer having a high saturated magnetic flux density and a magnetic material layer having a low saturated magnetic flux density, the thickness of the magnetic material layer having the high saturated magnetic flux density is 0.5 $\mu$m or more. According to the above described magnetic pole, the magnetic saturation near the tip portion of the magnetic pole is controlled, so that preferable magnetic field strength and magnetic field gradient can be attained when the track width is narrowed.

12 Claims, 11 Drawing Sheets

MAGNETIC HEAD

This application is a division of application Ser. No. 09/150,926 filed on Sep. 10, 1998 U.S. Pat. No. 6,108,167.

BACKGROUND OF THE INVENTION

1. Field of the Invention

The present invention relates to a thin-film magnetic head in which magnetic saturation is controlled at the tip portion when a track thereof narrows.

2. Description of the Related Art

Recently, high densifying of magnetic recording density progresses. For example, in HDD system, a system which is feasible to realize the high recording density of 1 Gbpsi/inch$^2$ becomes commercially practical, and it is nevertheless required to densify recording density. For achieving the high densifying of magnetic recording, such technical challenges as make a recording track of a thin-film magnetic head narrower in width, enlarge recording field with the thus narrowed track, and make magnetic inclination steeper in recording magnetic distribution in a line direction are remained for the persons in the art.

FIG. 18 depicts a structure of a thin-film magnetic head as a conventional and typical recording head. In FIG. 18, reference numeral 1 indicates a lower magnetic pole. An upper magnetic pole 3 is formed over the lower magnetic pole 1 with a recording magnetic gap 2 therebetween. The upper magnetic pole 3 has an air bearing surface (ABS) which is shaped corresponding to the track width. The upper magnetic pole 3 has a fan shape extending backward or to a coil (not shown) from the proximity of the air bearing surface. With the magnetic pole 3 having the shape shown in FIG. 18, the tip portion corresponding to the narrowed track width is hardly processed with high accuracy in the conventional manufacturing process of heads. Furthermore, magnetic saturation occurs at a narrow portion of the magnetic pole 3 (neck portion 4), so that it is difficult to generate large recording magnetic field.

For increasing recording magnetic strength, the same structure as that of the MIG (Metal In Gap) head which is used in a bulk head is conducted experiments on the thin-film magnetic head. A thin-film magnetic head provided with a magnetic material layer which has a high saturated magnetic flux density with an extra-thin thickness of about 0.2 μm at a portion opposing to a magnetic gap is particularly known. When the recording track width of the thin-film magnetic head is narrowed, in a laminated film of two magnetic material layers with different saturated magnetic flux densities, the magnetic saturation occurs at the side of a lower saturated magnetic flux density layer. Accordingly, not only recording magnetic field strength decreases but also magnetic field inclination reduces, thus losing resolution, so that a disadvantage such as deterioration of NLTS (Non linear Transition Shift) happens.

A T-shaped thin-film magnetic head shown in FIG. 19 is also suggested to prevent magnetic saturation at a portion being narrowed near the tip of a magnetic pole. The thin-film magnetic head shown in FIG. 19 is provided, at the proximity of the air bearing surface of at least one magnetic pole (upper magnetic pole 5 in FIG. 19), with a magnetic pole chip 5a contacting with the recording magnetic gap 2 and an auxiliary magnetic pole 5b which is wider than the magnetic pole chip in a state to have T-shaped figure at the air bearing surface of the magnetic pole 5.

The T-shaped magnetic pole 5, as shown in FIG. 20, can be realized by means of opening a trench 7 with a predetermined track width in an insulation layer 6 formed on the recording magnetic gap 2 and forming by embedding magnetic material layers in the trench 7. In the T-shaped magnetic pole 5 using the trench 7, since the magnetic pole 5a can be changed in the shape and the position thereof in accordance with the shape of the trench, the magnetic pole chip 5a with narrowed track can be accurately obtained.

However, when the surface width of the magnetic pole chip 5a opposing to the gap is narrowed for ever-more narrowing of the track width in the T-shaped magnetic pole 5, the magnetic saturation occurs because of magnetic flux concentration at the laminated portion (the contacting portion) between the magnetic pole chip 5a and the auxiliary magnetic pole 5b. In this case, disadvantages of decreasing recording magnetic field strength and magnetic field inclination happen.

It is also investigated that the magnetic pole chip 5a in the T-shaped magnetic pole 5 is made with magnetic materials having a saturated magnetic flux density which is higher than that of the auxiliary magnetic pole 5b. However, the troublesome magnetic saturation at the laminated portion between the magnetic pole 5a and the auxiliary magnetic pole 5b is not completely prevented with the foregoing structure.

To be more specific, when the recording magnetic field is enlarged to increase the recording magnetic field strength, the magnetic saturation tends to break out at the laminated portion between the magnetic pole chip 5a and the auxiliary magnetic pole 5b. If the magnetic saturation occurs at the laminated portion, enough electric current can not be sent into the magnetic pole chip 5a made of the magnetic material having high saturated magnetic flux density, so that the magnetic field strength can not be improved in proportion to the increase of the recording current. Furthermore, the magnetic gradient in the line direction lowers because of magnetic field leaked out from portions where the magnetic saturation occurs, then raising a deterioration in NLTS.

As described above, the conventional thin-film magnetic head involves such disadvantage as tend to cause the magnetic saturation at any portion in the head when narrowing. Since the magnetic saturation in the magnetic head causes the recording magnetic field strength and the magnetic field gradient to lower and further NLTS to deteriorate, high densifying of the magnetic recording density is prevented.

SUMMARY OF THE INVENTION

Accordingly, an object of the present invention is to provide a magnetic head which enables to control magnetic saturation at the proximity of the front portion in a magnetic pole to obtain excellent magnetic field strength and magnetic field gradient when the recording width is narrowed.

A first magnetic head according to the present invention is characterized by comprising a magnetic gap which is positioned to be situated on an air bearing surface, a pair of magnetic poles which are positioned to hold the magnetic gap therebetween and at least one of which being composed of a T-shaped magnetic pole having a magnetic pole chip contacting with the magnetic gap and an auxiliary magnetic pole which is wider than the magnetic pole chip, and a coil which is positioned between the pair of magnetic poles to intersect the magnetic poles, wherein the T-shaped magnetic pole has a laminated film including two or more kinds of magnetic material layers each having a different saturated magnetic flux density, and a magnetic material layer which is positioned at a side of the magnetic gap and has high saturated magnetic density out of the magnetic material layers in the laminated film, composing the magnetic pole chip and a portion of the auxiliary magnetic pole close thereto.

In the first magnetic head, not only the magnetic pole chip which composes the tip portion in the magnetic pole but also a portion of the auxiliary magnetic pole near the magnetic pole chip are composed with a magnetic material layer having high saturated magnetization. Accordingly, magnetic saturation is controlled at the contacting portion between the magnetic pole chip with a narrow width corresponding to the track width and the auxiliary magnetic pole. By controlling magnetic saturation at the portion between the magnetic pole chip and the auxiliary magnetic pole, preferable recording magnetic field strength and magnetic field gradient can be attained when the recording track is narrowed. Specifically, when recording current is increased to raise recording magnetic field strength, enough magnetic field strength can be attained corresponding to the electric current, furthermore, steepness of magnetic field gradient can be attained.

A second magnetic head according to the present invention is characterized by comprising a magnetic gap which is positioned to be situated an air bearing surface, a pair of magnetic poles which are positioned to hold the magnetic gap, and a coil which is positioned between the magnetic poles to intersect the magnetic poles, wherein at least one magnetic pole out of the pair of magnetic poles has the width at a the portion contacting with the magnetic gap of 1.8 $\mu$m or less and being composed of a laminated film including two or more kinds of magnetic material layers each having a different magnetic flux density at a proximity of the air bearing surface, and the thickness of a magnetic material layer having a high magnetic flux density positioned at a side of the magnetic gap in the laminated film being 0.5 $\mu$m or more.

A third magnetic head according to the present invention is characterized by comprising a magnetic gap which is positioned to be situated on the air bearing surface, a pair of magnetic poles which are positioned to hold the magnetic gap therebetween, and a coil which is positioned between the pair of magnetic poles to intersect the magnetic poles, wherein at least one magnetic pole out of the pair of magnetic poles is provided with a convex portion having a shape with the width of the air bearing surface of 1.8 $\mu$m or less and the height in the vertical direction to the air bearing surface of 2 $\mu$m or less and being composed of a laminated film including two or more kinds of magnetic material layers with different magnetic flux densities at a proximity of the air bearing surface, and the thickness of the magnetic material layer having a high saturated magnetic flux density positioned at a side of the magnetic gap out of the laminated film being 0.5 $\mu$m or more.

In the second and the third magnetic heads according to the present invention, the thickness of the magnetic material layer having a high saturated magnetic flux density is 0.5 $\mu$m or more, when the recording track width is narrowed to 1.8 $\mu$m or less. Namely, since magnetic flux is rarely concentrated when the track width is comparatively wide, magnetic gradient is increased by providing magnetic material having a high saturated magnetic flux density only at an extremely small area near a gap.

Comparing to this state, when the recording track width is narrowed to 1.8 $\mu$m or less, magnetic flux extremely concentrates and an influence of magnetic saturation becomes great. Therefore, the thickness of magnetic material layer having a high saturated magnetic flux density is 0.5 $\mu$m or more, so that preferable recording magnetic field strength and magnetic field gradient can be attained.

Specifically, as recognized from the third magnetic head, the air bearing surface is formed with the convex portion with the width of 1.8 $\mu$m or less and the height of 2 $\mu$m or less, so that the narrow track with the width of 1.8 $\mu$m or less can be accurately formed. At this time, since magnetic field strength extensively decreases if the height in the vertical direction to the air bearing surface is considerably high, the height of the convex portion in the vertical direction to the air bearing surface should be 2 $\mu$m or less.

DESCRIPTION OF THE PREFERRED EMBODIMENTS

Preferred embodiments of the present invention will be described below with reference to the attached drawings.

Figure 1:
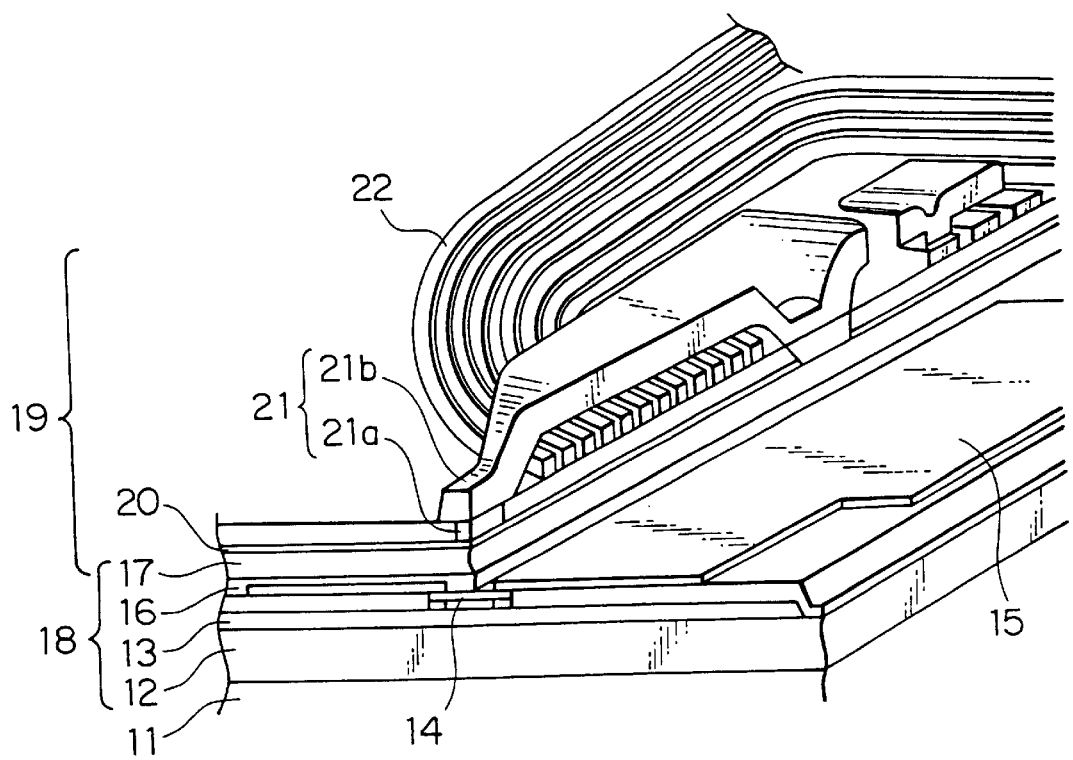
FIG. 1 is a fragmentary view which shows the structure of the principal portion in an embodiment of a magnetic recording/reproducing separation head with a magnetic head according to the present invention.

FIG. 1 is a fragmentary view which shows the structure of a principal portion in an embodiment of a magnetic recording/reproducing separation type head with a magnetic head according to the present invention. In this drawing, reference numeral 11 indicates a substrate. The substrate 11 is made, for example, of an $Al_2O_3$.TiC substrate having an $Al_2O_3$ layer. On the substrate 11, formed is a lower side magnetic shield layer 12 which is composed of a soft magnetic material such as NiFe alloy or amorphus CoZrNb alloy with a thickness of 1 to 2 $\mu$m or thereabouts.

On the lower side magnetic shield layer 12, a magneto-resistance effect film (MR film) 14 is formed with a lower side reproducing magnetic gap 13 thereunder which is composed of a non-magnetic insulation material such as $AlO_x$ with a thickness of 150 mm or thereabouts. With both edges of the MR film 14, connected are lead electrodes 15 which respectively supply sense electric current to the MR film 14. The MR film 14 and the lead electrodes 15 compose a reproducing element portion.

On the MR film 14 and the lead electrodes 15, an upper side magnetic shield layer 17 is formed with an upper side reproducing magnetic gap 16 thereunder which is composed of the same non-magnetic insulation material as that for the lower side reproducing magnetic gap 13. The upper side shield layer 17 is composed of the same soft magnetic material as that of the lower side magnetic shield layer 12. With the above explained component elements, a shield type MR head 18 is composed as a reproducing head.

On the shield type MR head 18 described above, a thin-film magnetic head 19 is provided as a recording head. A lower recording magnetic pole of the thin-film magnetic head 19 is composed of the same magnetic layer as the upper side magnetic shield layer 17. Namely, the upper side magnetic shield layer 17 of the shield type MR head 18 also serves as the lower recording magnetic pole for the thin-film magnetic head 19. On the lower recording magnetic pole 17 also serving as the upper side magnetic shield layer, provided is a recording magnetic gap 20 which is composed of a non-magnetic insulation material such as $AlO_x$.

An upper recording magnetic pole 21 is provided on the recording magnetic gap 20. The upper recording magnetic pole 21 of which a proximity of Air Bearing Surface (ABS) is composed of a magnetic pole chip 21a and an wider auxiliary magnetic pole 21b than that of the chip 21a, the details thereof being described later. The auxiliary magnetic pole 21b is extended backward from a laminated portion with the upper magnetic pole chip 21a. Coils 22 composed of Cu or the like are provided under the upper auxiliary magnetic pole 21b. In other words, the coils 22 are arranged between the upper auxiliary magnetic pole 21b and the lower recording magnetic pole 17. The coils 22 are embedded in an insulation layer such as polyimide which is not shown. As has described above, the principal part of the thin-film magnetic head 19 as a recording head is composed of these component elements.

Next, the portion fronting on and being close to media of the recording magnetic poles 17, 21 will be described with reference to FIG. 2, FIG. 3, FIG. 4, FIG. 5, FIG. 6, FIG. 7, FIG. 8, FIG. 9, FIG. 10, and FIG. 11.

Figure 2:
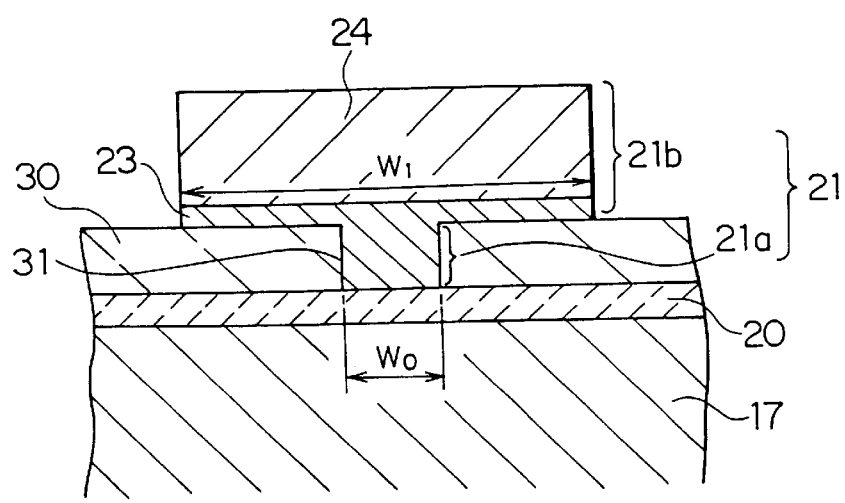
FIG. 2 is a view which shows a magnetic pole structure in the proximity of an air bearing surface in the first embodiment of a first thin-film magnetic head according to the present invention.

The upper recording magnetic pole 21 of which the proximity of the ABS is provided, for example as shown in FIG. 2, with the magnetic pole chip 21a which is positioned at the side of the recording magnetic gap 20 and the auxiliary magnetic pole 21b which is situated on the magnetic pole chip 21a. The magnetic pole chip 21a touches the recording magnetic pole gap 20 with a predetermined track width $W_0$. The auxiliary magnetic pole 21b is dimensionally wide compared with that of the magnetic pole chip 21a. The magnetic pole chip 21a and the auxiliary magnetic pole 21b compose a T-shaped magnetic pole.

The above described upper recording magnetic pole 21 formed into T is composed of a laminated film which contains two or more kinds of magnetic material layers each having different saturated magnetic flux density at least at the proximity of ABS. The upper recording magnetic pole 21 has a laminated film containing a first magnetic material layer 23 having a saturated magnetic flux density $Bs_1$, and a second magnetic material layer 24 having a saturated magnetic flux density $Bs_2$ which is lower than the saturated magnetic flux density $Bs_1$ ($Bs_2<Bs_1$).

It should be understood that the first and the second magnetic material layers 23, 24 are adapted to keep a combination in which the first magnetic material layer 23 shows a higher saturated magnetic flux density than that of the second magnetic material layer 24. The first magnetic material layer 23 is made of a magnetic material with a high saturated magnetic flux density (High Bs magnetic material) such as $Ni_{50}Fe_{50}$ alloy, CoFe alloy, iron nitride based material, and the like. In this case, the second magnetic material layer 24 can optionally employ permalloy ($Ni_{80}Fe_{20}$ and the like), amorphous CoFeZr alloy, sendust or the like which respectively has comparatively low saturated magnetic flux density. When satisfying a relation of $Bs_1>Bs_2$, other combinations, besides the above explained combination, can be applied.

Figure 3:
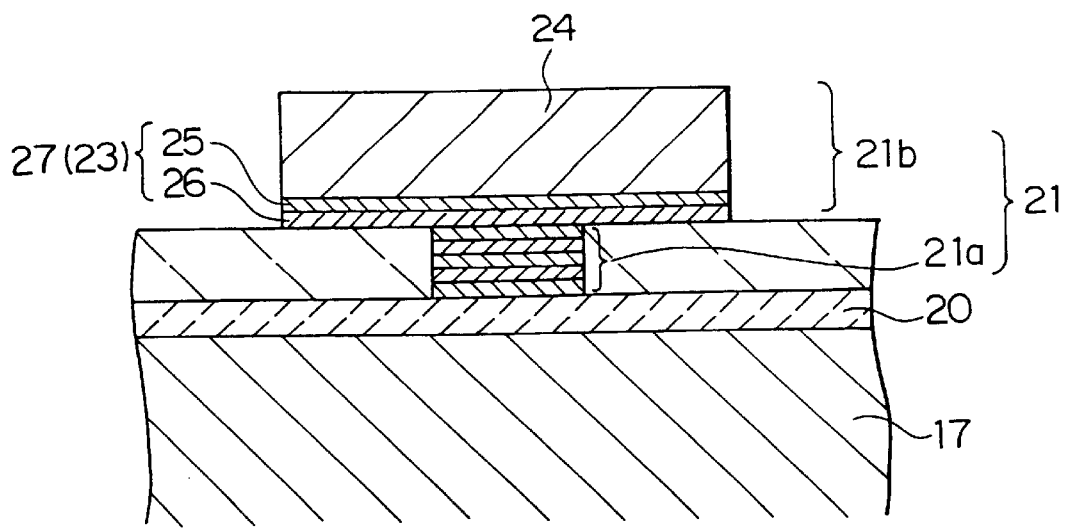
FIG. 3 is a view showing a modification of the thin-film magnetic head shown in FIG. 2.
Figure 4:
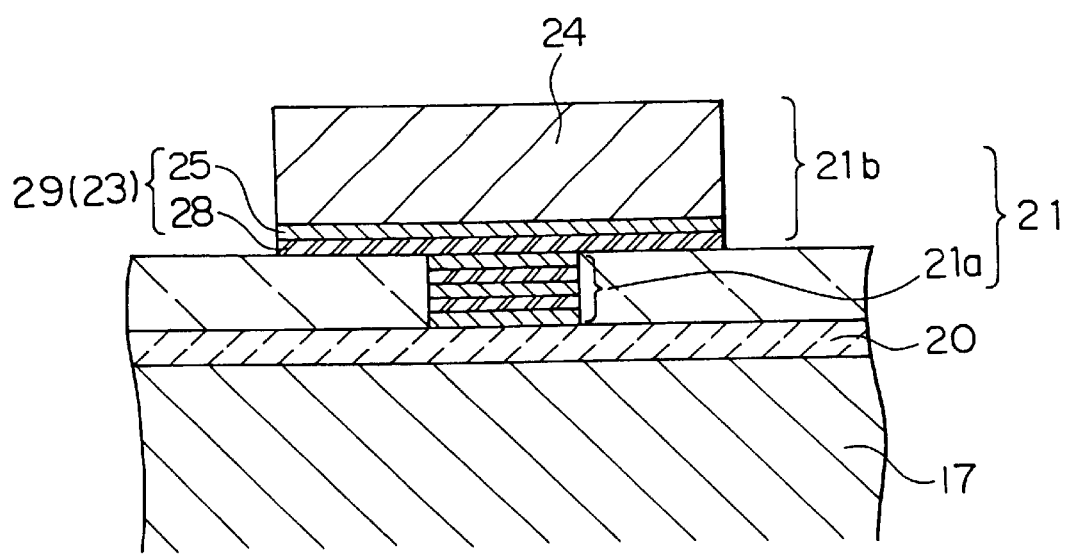
FIG. 4 is a view showing another modification of the thin-film magnetic head shown in FIG. 2.

The first magnetic material layer 23 showing a high saturated magnetic flux density can be altered with a muti-layered film 27 with a first magnetic film 25 and a second magnetic film 26 as shown in FIG. 3, or a multi-layered film 29 with a magnetic film 25 and a non-magnetic film 28 as shown in FIG. 4. The multi-layered films 27, 29 are available to be composed with various combinations of materials. It is more recommended to employ a combination in which a magnetic character such as a high saturated magnetic density, a high permeability can be obtained, and a combination in which electric resistance becomes stronger to control eddy current loss.

The multi-layered film 27 can employ such combination as ferric alloy and amorphous alloy such as CoZrNb or substances each having different crystalline diameter. The thus mentioned multi-layered film 27 attains fine-grain state of magnetic particle, which contributes an improvement in soft magnetic characteristics. The multi-layered film 29 can employ such combination as ferric alloy and electrical insulator like $SiO_x$. The thus explained multi-layered film 29 attains a high electrical resistance state, which contributes a reduction of an eddy currents loss. Incidentally, the multi-layered films 27, 29 can be appropriated for the second magnetic material layer 24.

In the laminated film with the first magnetic material layer 23 and the second magnetic material layer 24, the first magnetic material layer 23 having a high saturated magnetic flux density forms the upper magnetic pole chip 21a and a part of the upper auxiliary magnetic pole 21b near the upper magnetic pole chip 21a. In concrete, the upper magnetic pole chip 21a and a bottom portion of the upper auxiliary magnetic pole 21b having a thickness of 0.3 μm or thereabouts is formed of the first magnetic material layer 23. The remaining portion of the upper auxiliary magnetic pole 21b with a thickness of 3 μm or thereabouts is composed of the second magnetic material layer 24.

The high Bs material layer (a part of the first magnetic material layer 23 ) corresponding to the bottom portion of the upper auxiliary magnetic pole 21b proves an improved effect of magnetic gradient when the thickness thereof is considerably thick. When the thickness of the high Bs material layer is extremely thin, the magnetic saturation can not be prevented. Accordingly, the bottom portion of the upper auxiliary magnetic pole 21b in the first magnetic material layer 23 is preferable to have a thickness of 0.1 μm to 0.5 μm or thereabouts.

The magnetic pole structure shown in FIG. 2 obtains the follow. At the first step, the upper magnetic pole chip 21a is formed by embedding with the high Bs material (first magnetic material 23) inside a trench 31 opened in an insulation layer 30 composed of $SiO_x$ and the like by means of the spatter method. After smoothing an upper surface corresponding to the upper magnetic pole chip 21a, the high Bs material layer (First magnetic material layer 23) is further laminated to an extent corresponding to the bottom part of the upper auxiliary magnetic pole 21b. Next, a low Bs material layer (Second magnetic material layer 24) is formed.

The upper auxiliary magnetic pole 21b can be provided by patterning by means of such as a standard PEP (Photo Engravement Process). Alternatively, the upper auxiliary magnetic pole 21b can be formed by patterning in accordance with the form of the upper auxiliary magnetic pole 21b after the first magnetic material layer 23 is continuously laminated from the upper magnetic pole chip 21a to the portion corresponding to the bottom portion of the upper auxiliary magnetic pole 21b and the second magnetic material layer 24 is further formed thereon.

Figure 5:
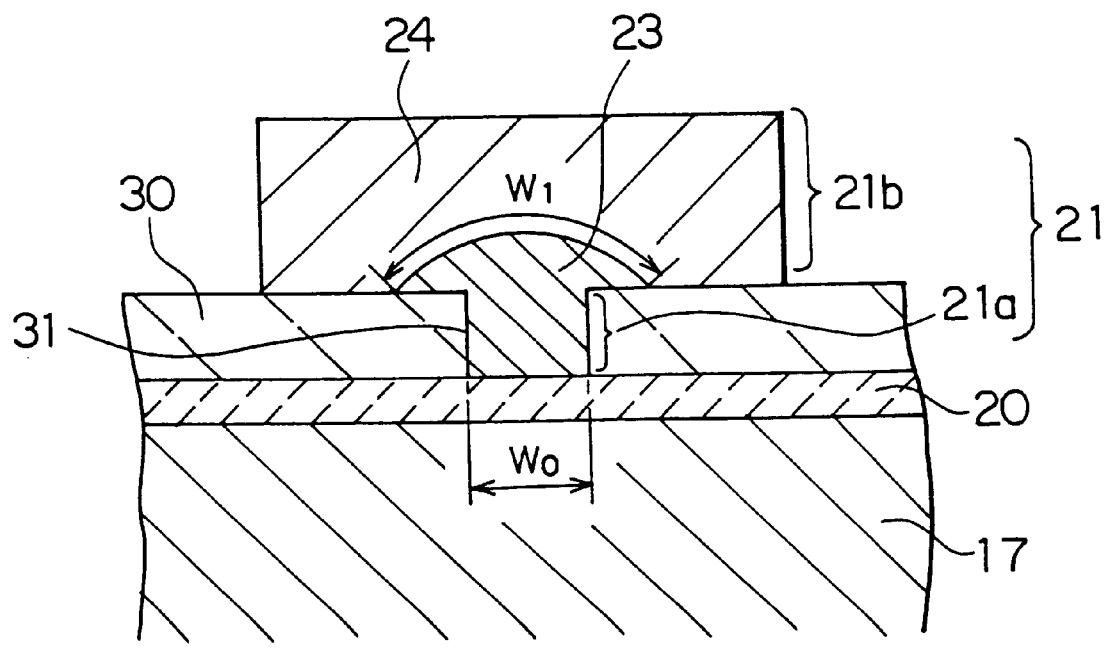
FIG. 5 is a view which shows the magnetic pole structure in the proximity of the air bearing surface in the second embodiment of the first thin-film magnetic head according to the present invention.

As shown in FIG. 2, the portion in the upper auxiliary magnetic pole 21b composed of the first magnetic material layer 23 need not to be uniformly provided to form on the bottom surface portion of the upper auxiliary magnetic pole 21b. For example, as shown in FIG. 5, the first magnetic material layer 23 can be formed into a shape projecting from the upper magnetic pole chip 21a toward the upper auxiliary magnetic pole 21b. The structure described above can be realized by applying, for example, a plating process to obtain the upper magnetic pole chip 21a with the first magnetic material layer 23 with high Bs materials.

Namely, when the upper magnetic material pole chip 21a is provided with the first magnetic material layer 23 by means of the plating process, the first magnetic material layer 23 is finished to have a form rising upward from the upper magnetic pole chip 21a. The rising portion can be used as a part of the upper auxiliary magnetic pole 21b. Next, the second magnetic material layer 24 is further laminated and patterned into a form in conformity with the upper auxiliary magnetic pole 21b to obtain the magnetic pole structure shown in FIG. 5.

Reviewing the upper recording magnetic pole 21 as the T-shaped magnetic pole shown in FIG. 2 and FIG. 5, the width $W_1$ corresponding to the touching portion, where a portion of the upper auxiliary magnetic pole 21b composed of the first magnetic material layer 23 contacts with the remaining portion of the upper auxiliary magnetic pole 21b composed of the second magnetic material layer 24, is recommended to be set wider than the track width $W_0$ (a contacting width between the magnetic pole chip 21a and the recording magnetic gap 20) in accordance with a ratio of a saturated magnetic flux density of the first magnetic material layer 23 and that of the second magnetic material layer 24.

Namely, a proportion of the width $W_1$ of the contacting portion and the track width $W_0$ is recommended to be set, in accordance with the saturated magnetic flux density $Bs_1$ of the first magnetic material layer 23 and the saturated magnetic flux density $Bs_2$ of the second magnetic material layer 24, that is, to satisfy a relation; $W_1/W_0 \geq Bs_1/Bs_2$. The ratio of $W_1$ and $W_0$ ($W_1/W_0$) is set to be larger than the ratio of saturated magnetic flux densities ($Bs_1/Bs_2$), so that recording current with which only a portion opposing to a gap of the upper magnetic pole chip 21a is magnetically saturated can be sent without magnetic saturation at the laminated portion of the first magnetic material layer 23 and the second magnetic material layer 24.

As described above, the high Bs first magnetic material layer 23 is appropriated not only for the upper magnetic pole chip 21a but also for a part of the bottom portion in the upper auxiliary magnetic pole 21b, and the remaining portion of the upper auxiliary magnetic pole 21b is further formed thereon with the low Bs second magnetic material layer 24, so that magnetic saturation can be controlled at the contacting portion between the upper portion magnetic pole chip 21a with the narrow width corresponding to the track width $W_0$ and the upper auxiliary magnetic pole 21b. Accordingly, even if the track width further narrows, excellent recording magnetic field strength and magnetic field gradient can be attained. The above described effect is specifically remarkable when the recording track width $W_0$ narrows to 1.8 μm or less.

Furthermore, in a thin-film magnetic head having the recording track $W_0$ width of 1.8 μm or less, when recording current is increased to gain recording magnetic field strength, the magnetic field strength can be correspondingly raised, therefore more preferable magnetic field gradient can be attained. Namely, a thin-film magnetic head 19 as a recording head having excellent magnetic field strength and magnetic field gradient can be realized.

The high Bs first magnetic material layer 23 composing a portion of the upper auxiliary magnetic pole 21b provides advantages in control of the magnetic saturation at a corner portion of the upper auxiliary magnetic pole 21b. Accordingly, undesired recording because of leaked magnetic field from the corner portion can be prevented. If all the portions of the upper auxiliary magnetic pole are composed of the low Bs soft magnetic layer as the conventional T-shaped magnetic pole, the magnetic saturation occurs at the corner portion of the upper auxiliary magnetic pole to thereby arise undesired recording at needless area because of the leaked magnetic field from the corner portion.

Moreover, the conventional recording head needs to be shortened in length of depth (throat height) of the air bearing surface of the recording magnetic gap when the track width narrows. The width of the upper portion auxiliary magnetic pole 21b is set wider instead to prevent magnetic saturation at the contacting portion, so that enough magnetic flux is supplied to the magnetic pole chip 21a through the auxiliary magnetic pole 21b. Consequently, throat height can be lengthened.

For example, when the upper recording magnetic pole 21 shown in FIG. 2 and FIG. 5 provided with the recording head having the throat height of 5 μm is used to record on the magnetic recording media having the coercive force of ~2100 Oe, the over-light characteristics reaches 38 dB to generate enough recording magnetic field. In the conventional recording head, since the over-light characteristics considerably depends on the throat height, when integrated with the MR reproducing component or the GRM reproducing component of which reproducing output also considerably depend on the stripe height, a run-in processing margin of ABS surface extremely becomes small because of disalignment between the throat height end and the stripe height end. The thin-film magnetic head according to the present invention has the throat height margin by an order of several μm, thus improving the manufacturing yield.

The magnetic pole structure shown in FIG. 2 and FIG. 5 is the preferable example in which the proximity of the air bearing surface of the upper recording magnetic pole 21 is composed of a two-layered laminated film containing the high Bs first magnetic material layer 23 and the low Bs second magnetic material layer 24. The proximity of the air bearing surface of the upper recording magnetic pole 21 is, as shown in FIG. 6 and FIG. 7, able to be composed of a laminated film including three or more magnetic material layers.

Figure 6:
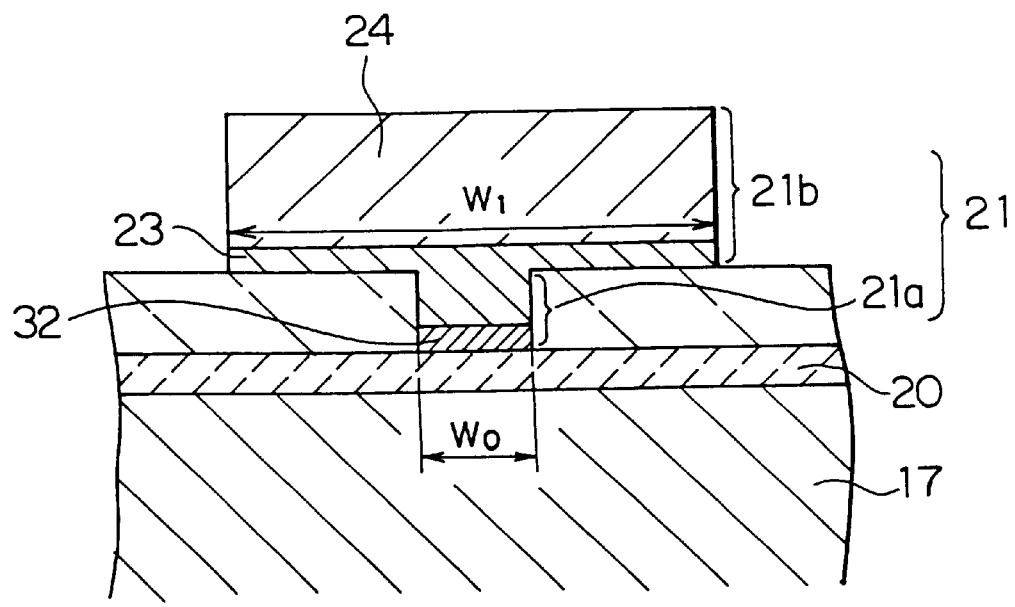
FIG. 6 is a view showing a modification of the magnetic pole structure in the thin-film magnetic head shown in FIG. 2.
Figure 7:
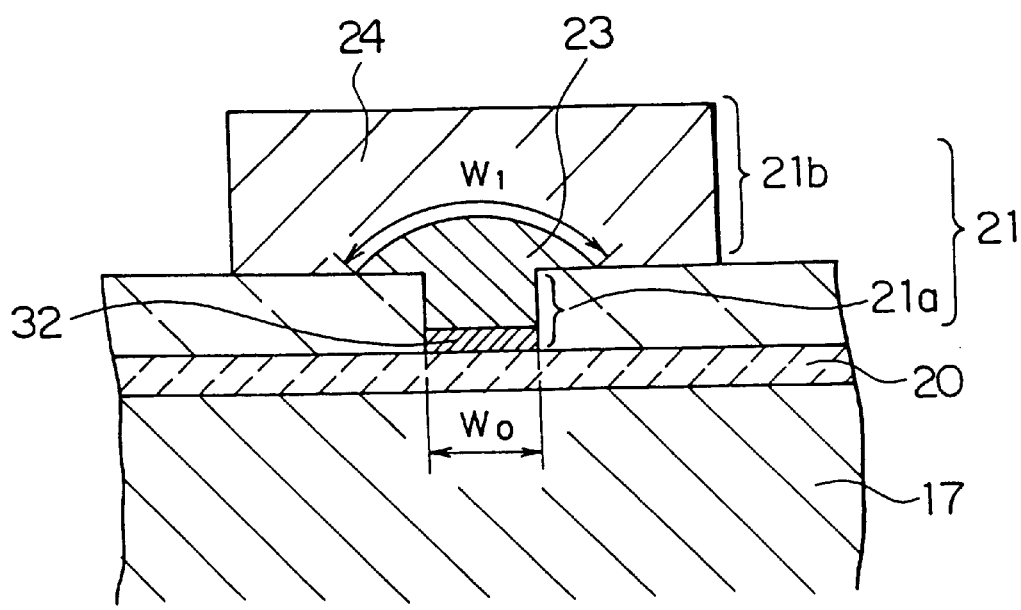
FIG. 7 is a view showing a modification of the magnetic pole structure in the thin-film magnetic head shown in FIG. 5.

Now, the magnetic pole shown in FIG. 6 and FIG. 7 is provided with a third magnetic material layer 32, which shows further higher saturated magnetic flux density $Bs_3$ than that of the first magnetic material layer 23 ($Bs_3 > Bs_1$), at the extremity of the upper magnetic pole chip 21a, that is the portion in the upper magnetic pole chip 21a contacting with the recording magnetic gap 20. The third magnetic material layer 32 can be made of iron nitride materials such as FeZrN or FeN with the thickness of 0.2 μm or thereabouts.

Namely, the proximity of the air bearing surface of the upper recording magnetic pole 21 is formed from a laminated film containing the third magnetic material layer 32 having the highest saturated magnetic flux density $Bs_3$, the first magnetic material layer 23 made of the high Bs material ($Bs_1$), and the second magnetic material layer 24 made of the low Bs material ($Bs_2$). These magnetic material layers 32, 23, and 24 can be formed under a combination of various magnetic materials in which each saturated magnetic flux density satisfies the relation, $Bs_3 > Bs_1 > Bs_2$. When the above described magnetic pole is applied, the magnetic field strength further increases and the magnetic field gradient becomes steeper.

Figure 8:
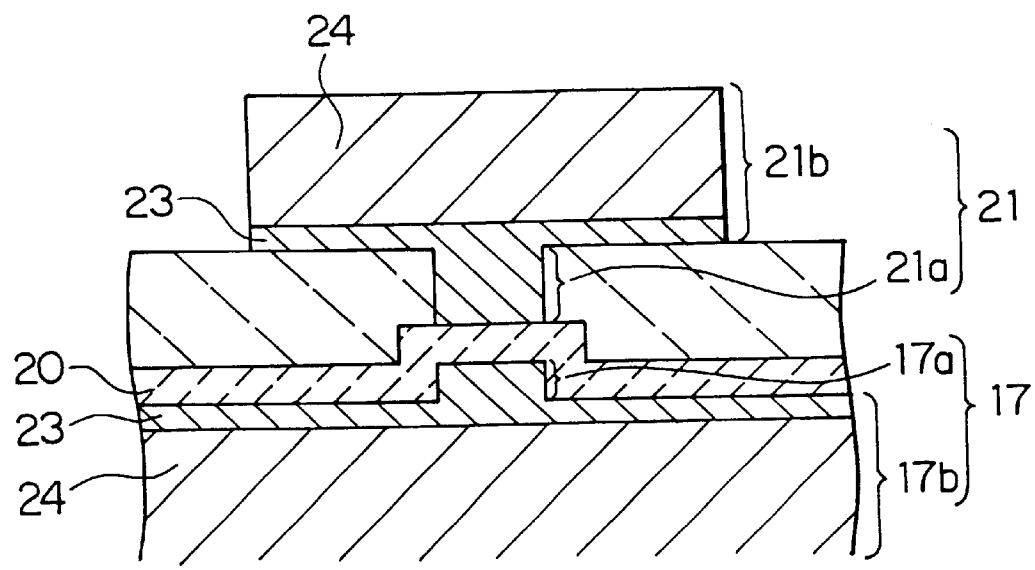
FIG. 8 is a view which shows the magnetic pole structure in the proximity of the air bearing surface in the third embodiment of the first thin-film magnetic head according to the present invention.
Figure 9:
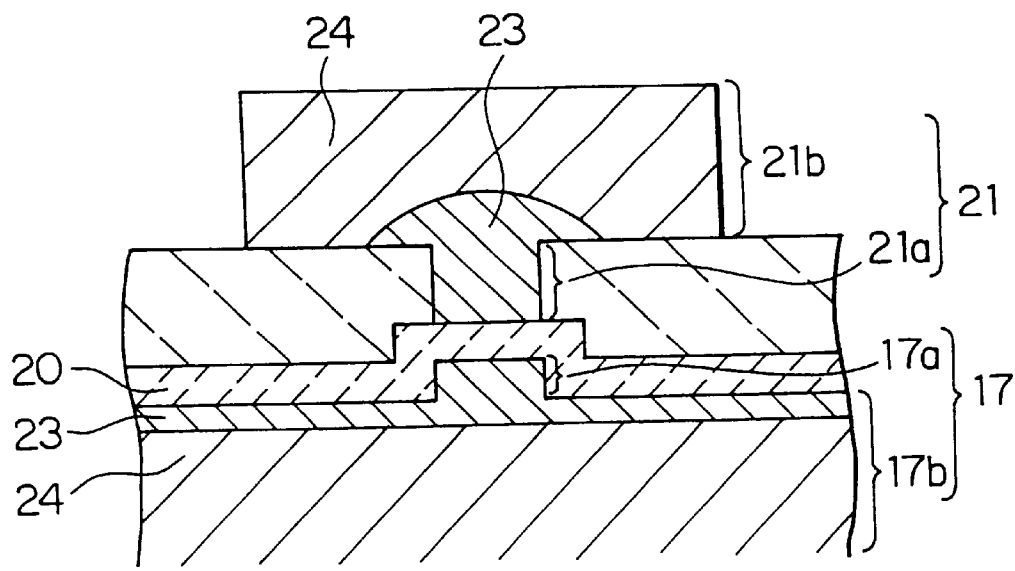
FIG. 9 is a view which shows the magnetic pole structure in the proximity of the air bearing surface in the fourth embodiment of the first thin-film magnetic head according to the present invention.

In the foregoing embodiment, the example, in which only the upper recording magnetic pole 21 is intentionally formed as the T-shaped magnetic pole, is described, the lower recording magnetic pole 17 opposing to the upper recording magnetic pole 21 with the recording magnetic gap 20 therebetween, as shown in FIG. 8 and FIG. 9, can be formed as the T-shaped magnetic pole which is lifted toward the recording magnetic gap 20, too. The lower recording magnetic pole 17 having a lower magnetic pole chip 17a which is raised upward and a corresponding lower auxiliary magnetic pole 17b which is wider than that of the chip 17a can be obtained, for example, by trimming 0.5 μm or thereabouts off the lower recording magnetic pole 17 remaining the section corresponding to the track width.

Figure 10:
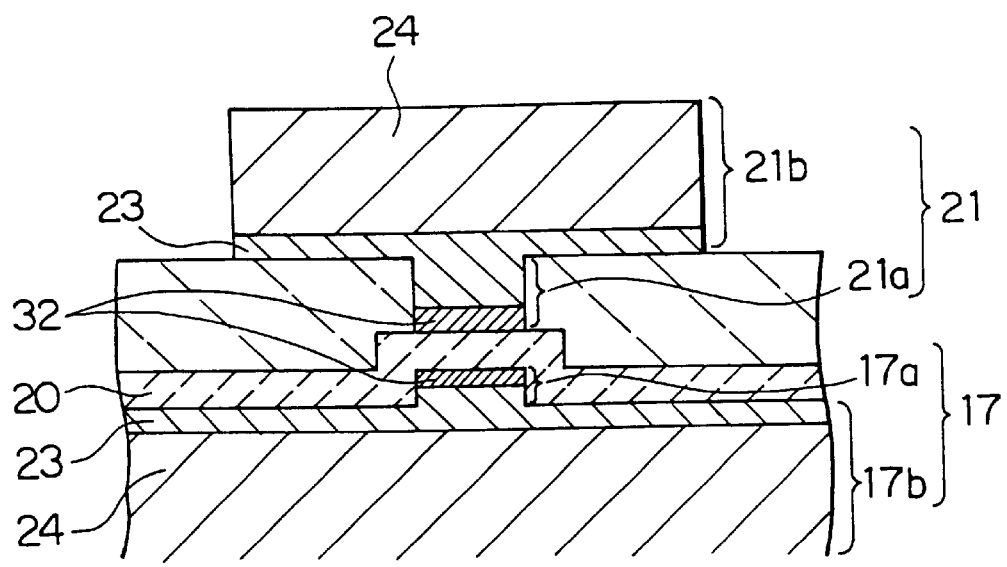
FIG. 10 is a view showing a modification of the magnetic pole structure in the thin-film magnetic head shown in FIG. 8.
Figure 11:
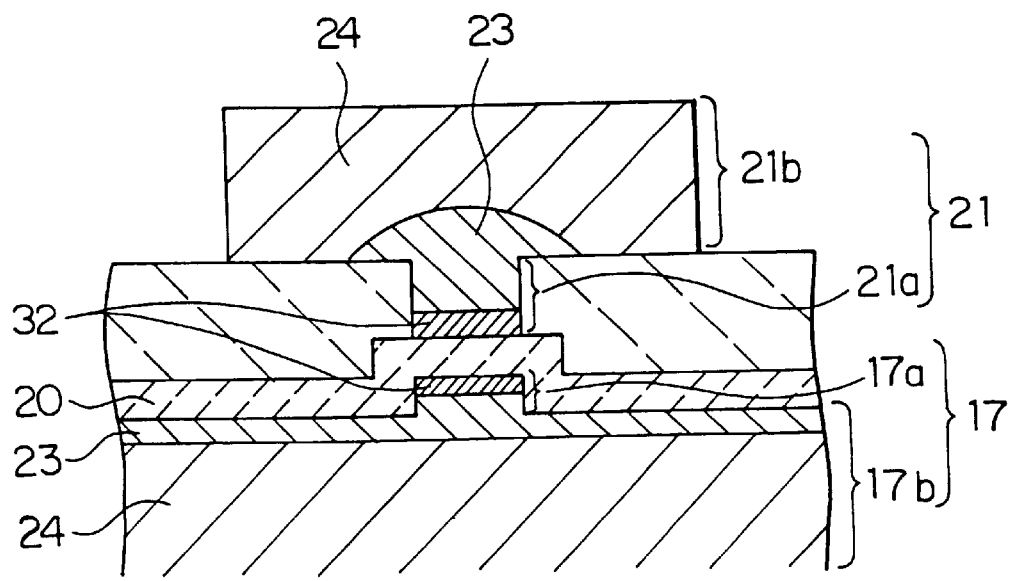
FIG. 11 is a view showing a modification of the magnetic pole structure in the thin-film magnetic head shown in FIG. 9.

When the magnetic pole structure shown in FIG. 8 and FIG. 9 is applied, the recording magnetic field in the track width direction becomes steeper to be more preferable to record with the narrowed track. In the lower recording magnetic pole 17, it is preferable that the lower magnetic pole chip 17a and a portion of the lower auxiliary magnetic pole 17b close thereto are composed of the high Bs first magnetic material layer 23, and the remaining portion of the lower auxiliary magnetic pole 17b is composed of the low Bs second magnetic material layer 24. Furthermore, as shown in FIG. 10 and FIG. 11, only the portions of the lower magnetic pole chip 17a and the upper magnetic pole chip 21a respectively contacting with the recording magnetic gap 20 can be provided with a third magnetic material layer 32 having a further higher saturated magnetic flux density than that of the first magnetic material layer 23.

The above explained relation between the ratio of the contacting width of the magnetic pole chip 21a and the auxiliary magnetic pole 21b and the track width, and the ratio of the saturated magnetic flux densities between the first magnetic material layer 23 and the second magnetic material layer 24 is effective in the standard T-shaped magnetic pole.

Figure 12:
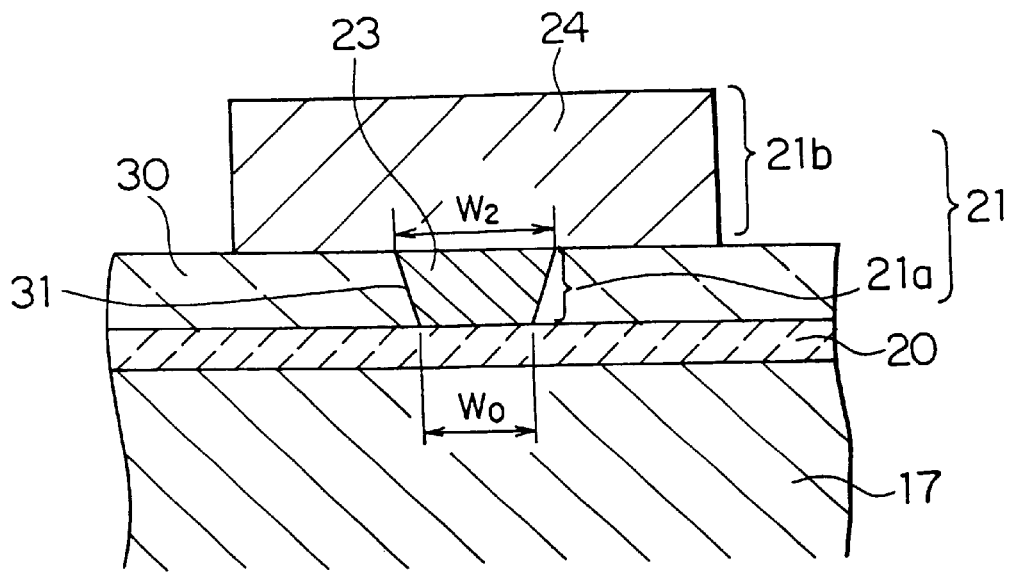
FIG. 12 is a view showing an example in which the magnetic pole structure according to the present invention is applied to another T-shaped magnetic pole.

Namely, in the magnetic structure shown in FIG. 12, the proximity of the air bearing surface of the upper recording magnetic pole 21 is provided with the magnetic pole chip 21a which contacts with the recording magnetic gap 20 with the predetermined track width $W_0$ and, the auxiliary magnetic pole 21b which is positioned above the magnetic pole chip 21a and wider than the width $W_0$.

The upper magnetic pole chip 21a is formed of the first magnetic material layer 23 made of magnetic material having a high saturated magnetic flux density, for example $Ni_{50}Fe_{50}$ alloy or the like. The upper auxiliary magnetic pole 21b is formed of the second magnetic material layer 24 made of permalloy ($Ni_{80}Fe_{20}$ or the like), amorphous CoFeZr alloy or the like having a comparatively low saturated magnetic flux density. The proximity of the ABS of the upper recording magnetic pole 21 is composed of these laminated film. The component materials for the first magnetic material layer 23 and the second magnetic material layer 24 are the same as those in the aforementioned embodiment.

The width $W_2$ of the upper magnetic pole chip 21a contacting with the upper auxiliary magnetic pole 21b is set wider than the track width $W_0$ (the width contacting with the recording magnetic gap 20) in accordance with the ratio of the saturated magnetic flux densities of the first magnetic material layer 23 and the second magnetic material layer 24. That is to satisfy the relation, $W_2/W_0 \geq Bs_1/Bs_2$.

The above explained magnetic pole shape can be obtained by the steps of the following. At the first step to obtain it, the angle of the side walls of a trench 31 is adjusted with the etching conditions to form the trench 31 in an insulation layer 30 made of $SiO_x$ or the like by means of the PEP and the chemical dry etching. Next, the high Bs first magnetic material layer 23 is formed by embedding in the trench 31 by means of the spatter method or the like.

As explained above, by setting the ratio of the respective width of the upper magnetic pole chip 21a ($W_{21}/W_0$) wider than the ratio of the saturated magnetic flux densities ($Bs_1/Bs_2$), the magnetic saturation can be prevented at the contacting portion between the upper magnetic pole chip 21a and the upper auxiliary magnetic pole 21b (the laminated portion) even if recording current, with which the portion of the upper magnetic pole chip 21a opposing to the gap is magnetically saturated, is passed. Therefore, lowering of magnetic field strength and deterioration of magnetic gradient can be controlled.

For example, when the first magnetic material layer 23 is made of $Ni_{50}Fe_{50}$ alloy having a saturated magnetic flux density of 1.57T and the second magnetic material layer 24 is made of amorphous CoFeZr alloy having a saturated magnetic flux density of 1.2T, the width (the track width) $W_0$ of the upper magnetic pole chip 21a opposing to the recording magnetic gap 20 is set in 1.2 μm. In this case, the width $W_2$ of the upper magnetic pole chip 21a contacting with the upper auxiliary magnetic pole 21b, that is the width of the joint portion of the T-shaped magnetic pole, is set in more than 1.2×(1.5/1.2)=1.5 μm. Thus, the magnetic saturation can be prevented at the contacting portion between the upper magnetic pole chip 21a and the upper auxiliary magnetic pole 21b (the laminated portion) even if recording current, with which the portion of the upper magnetic pole chip 21a opposing to the gap is magnetically saturated, is passed. Consequently, the thin-film magnetic head showing preferable magnetic field strength and magnetic field gradient can be realized.

Figure 13:
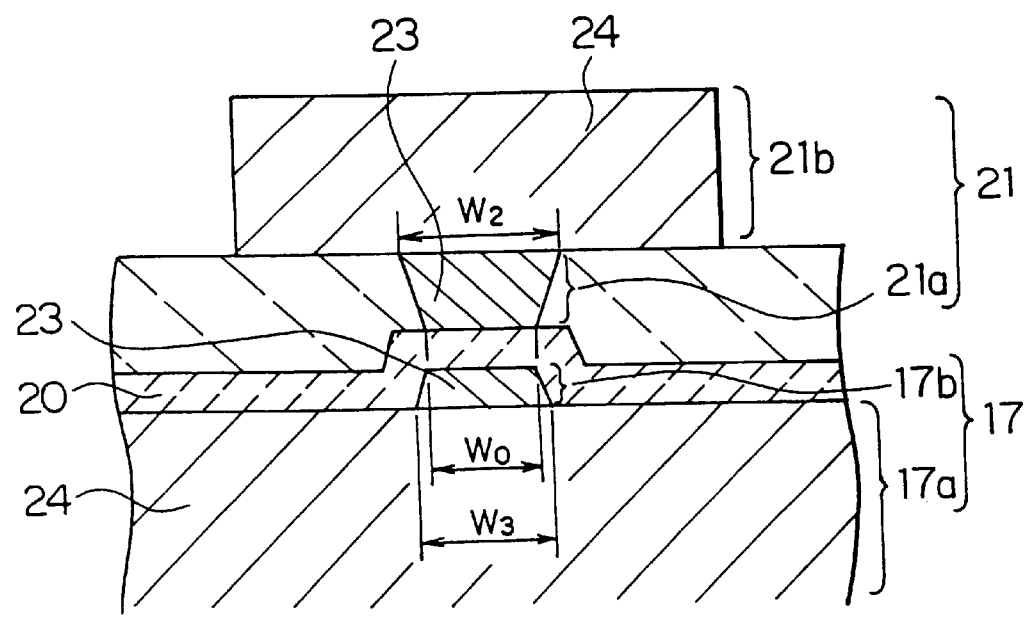
FIG. 13 is a view showing another example in which the magnetic pole structure according to the present invention is applied to another T-shaped magnetic pole.

In the above described thin-film magnetic head, as shown in FIG. 13, the lower recording magnetic pole 17 can be formed as the T-shaped magnetic pole which is lifted toward the recording magnetic gap 20, too. Furthermore, in the lower recording magnetic pole 17, the lower magnetic pole chip 17a is recommended to be made of the high Bs first magnetic material layer 23 and the lower auxiliary magnetic pole 17b is also recommended to be made of the low Bs second magnetic material layer 24, and the width $W_3$ of the lower magnetic pole chip 17a contacting with the lower auxiliary magnetic pole 17b is recommended to be set wider than the width $W_0$ occupying a contacting portion with the recording magnetic gap 20 in accordance with the ratio of the saturated magnetic flux densities ($Bs_1/Bs_2$). Namely, it is preferable to satisfy the relation, $W_3/W_0 \geq Bs_1/Bs_2$.

In the above explained embodiment, the T-shaped magnetic pole structure according to the present invention is mainly applied in the trench pall structure to be formed by embedding the magnetic material in the trench, however, the thin-film magnetic head structure in the scope of the present invention is not limited to this structure. The magnetic head according to the present invention can be applied to, for example, the notch structure taught in Japanese Patent Laid-open Application No. Hei 7-296328, and to the structure by embedding a magnetic pole tip portion into a structure formed in advance described in the U.S. Pat. No. 5,283,942.

The T-shaped magnetic pole is superior on the magnetic gradient compared with other magnetic poles which will be described later, since employing a narrowed structure toward the vicinity of the magnetic gap. The proximity of the air bearing surface in the T-shaped magnetic pole is optionally available to be formed with the high Bs magnetic material layer until the uppermost portion of the auxiliary magnetic pole.

Figure 14:
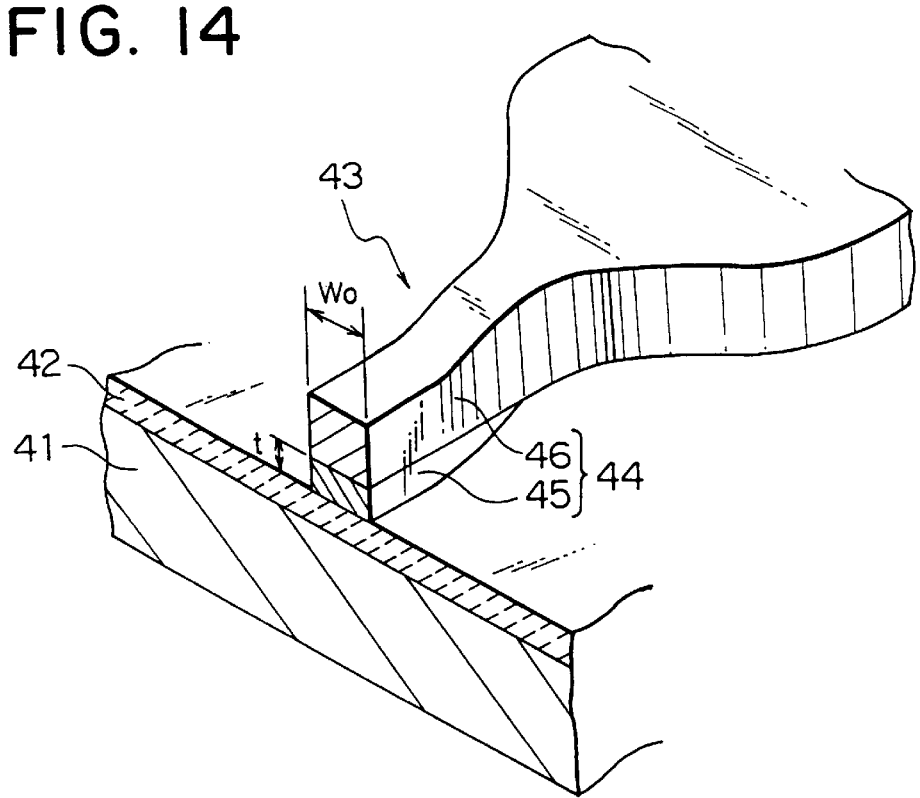
FIG. 14 is a perspective view which shows the composition of the principal portion in an embodiment of a second thin-film magnetic head according to the present invention.
Figure 15:
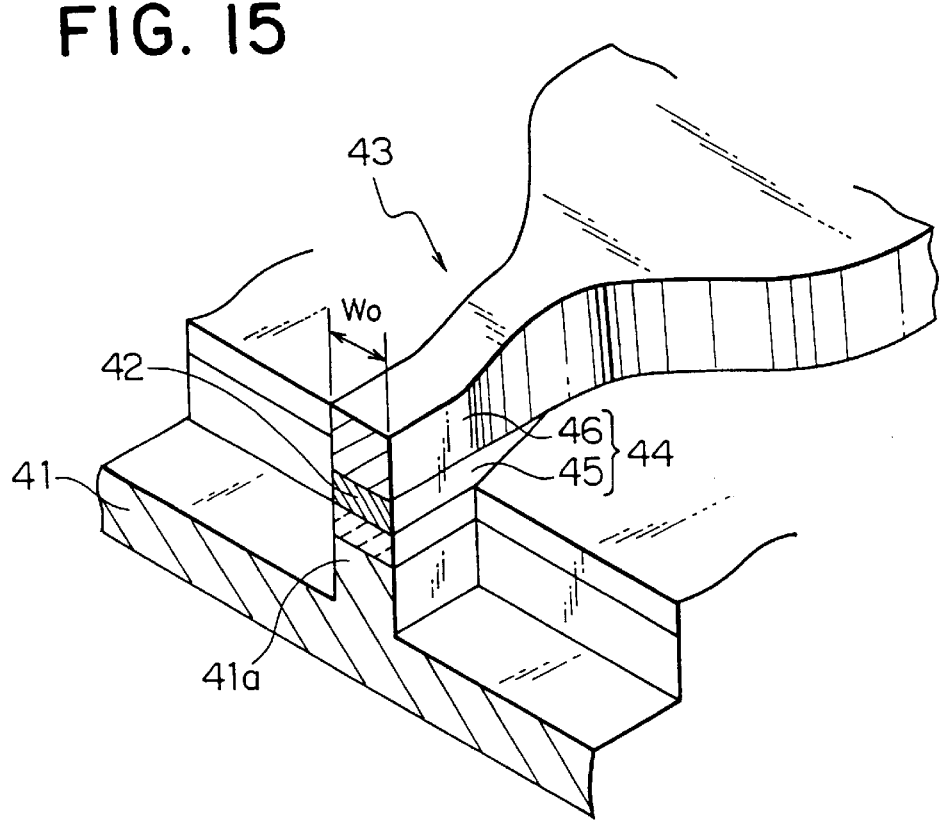
FIG. 15 is a perspective view showing a modification of the thin-film magnetic head shown in FIG. 14.

Next, an embodiment of a second magnetic head according to the present invention will be described in reference to FIG. 14 and FIG. 15. FIG. 14 is a perspective view which shows the composition of the principal portion in an embodiment of the second magnetic head according to the present invention. FIG. 14 only shows the principal portion of the thin-film magnetic head as a recording head. The whole structure of the thin-film magnetic head in this embodiment, and the whole structure of a magnetic recording/reproducing separation head using the same are the same as those in FIG. 1.

The thin-film magnetic head shown in FIG. 14 is provided with a lower magnetic pole (lower recording magnetic pole) 41, a magnetic gap (recording magnetic gap) 42 formed thereon, and an upper magnetic pole (upper recording magnetic pole) 43 further formed thereon. The lower magnetic pole 41 and the magnetic gap 42 are made of the same materials as described above.

The upper magnetic pole 43 is composed of a laminated film including two or more kinds of magnetic material layers each having a different saturated magnetic flux density at least at the proximity of the air bearing surface. In concrete, the upper magnetic pole 43 is provided with a laminated film 44 containing a first magnetic material layer 45 having the saturated magnetic flux density $Bs_1$ and a second magnetic material layer 46 having the saturated magnetic flux density $Bs_2$ which is lower than the saturated magnetic flux density $Bs_1$ ($Bs_2 < Bs_1$).

The first and the second magnetic material layers 45, 46 can be formed under a combination of magnetic materials as those in the above explained embodiment. Furthermore, the high Bs first magnetic material layer 45 can be made of a multi-layered film having various magnetic material layers as shown in FIG. 3, or a multi-layered film including a magnetic layer and a non-magnetic layer as shown in FIG. 4. The combination of these materials for the multi-layered films is also the same as the above instance. The second magnetic material layer 46 can employ a multi-layered film.

The proximity of the air bearing surface of the upper magnetic pole 43 composed of a laminated film 44 which contains the first magnetic material layer 45 and the second magnetic material layer 46 is formed into a shape corresponding to the recording track width $W_0$ by means of the FIB (Focused Ion Beam) process from the laminating direction. Namely, the width of the air bearing surface of the laminated film 44 is defined to correspond to the track width $W_0$, and the high Bs first magnetic material layer 45 positioned at the side of the magnetic gap 42 makes contact with the magnetic gap 42 with the track width $W_0$.

The thin-film magnetic head in this embodiment is narrowed in the track width $W_0$ of 1.8 μm or less. Since the tip portion of the thin-film magnetic head is processed by means of the FIB, the upper magnetic pole 43 corresponding to the recording track width $W_0$ of 1.8 μm or less can be accurately obtained. The tip portion of the upper magnetic pole 43 can be naturally processed by the standard PEP process, in which it is preferable to use a light with a short wavelength for exposure at the time of the PEP to improve the processing accuracy.

The thickness t of the high Bs first magnetic material layer 45 is 0.5 μm or more to make the recording track width $W_0$ correspond to the magnetic head with the narrowed to 1.8 μm or less. In other words, with the conventional magnetic head with comparatively wide track width, the magnetic flux rarely concentrates, so that the very small area near the gap is provided with the high Bs magnetic material to increase magnetic field gradient.

If the recording track width $W_0$ is narrowed to 1.8 μm or less, the magnetic flux extremely concentrates, then an influence of magnetic saturation becomes great. Therefore, in the second magnetic head according to the present invention, the thickness of the high Bs first magnetic material layer 45 is set in more than 0.5 μm. Accordingly, preferable recording magnetic field strength and magnetic field gradient can be attained. However, if the thickness of the high Bs first magnetic material layer 45 is considerably thick, the improved effect in magnetic field gradient detracts, so that the thickness of the first magnetic material layer 45 is recommended to be set in less than 2.0 μm.

Reviewing in the case of the narrowing the recording track width $W_0$ less than 1.8 μm, by making the thickness t of the high Bs first magnetic material layer 45 of 0.51 μm or more, the magnetic saturation can be controlled at the laminated portion of the first magnetic material layer 45 and the second magnetic material layer 46 in the tip portion of the upper magnetic pole 43 corresponding to the track width $W_0$. Accordingly, when the recording track width $W_0$ is 1.8 μm or less, preferable recording magnetic field strength and magnetic field gradient can be realized.

The relation between magnetic field strength and magnetic field gradient when the recording track width $W_0$ and the thickness t of the high Bs first magnetic material layer 45 are changed is shown in Table 1. Here, the first magnetic material layer 45 is made of $Ni_{50}Fe_{50}$ with the saturated magnetic flux density $Bs_1$ of 1.4 T and the second magnetic material layer 46 is made of $Ni_{80}Fe_{20}$ with the saturated magnetic flux density of 0.9 T.

TABLE 1

|  |  | Thickness t of first magnetic material layer 45 | | | |
|---|---|---|---|---|---|
|  |  | 0.3 μm | | 1.0 μm | |
|  |  | Magnetic field strength | Magnetic field gradient | Magnetic field strength | Magnetic field gradient |
| Track width $W_0$ | 1 μm | × | × | ○ | ○ |
|  | 2 μm | ○ | ○ | ○ | × |

As shown in Table 1, it is understandable that when the recording track width is comparatively wide, by making the thickness t of the high Bs first magnetic material layer 45 thin, preferable magnetic field strength and magnetic field gradient can be attained. Contrary, when the recording track is narrowed, by making the thickness t of the high Bs first magnetic material layer 45 thick, preferable magnetic field strength and magnetic field gradient can be realized.

As shown in FIG. 6 and FIG. 7, the proximity of the air bearing surface of-the upper magnetic pole 43 can be composed of a laminated film including three or more magnetic material layers. Namely, the proximity of the air bearing surface of the upper magnetic pole 43 can be composed of a laminated film containing the third magnetic material layer having the highest saturated magnetic flux density $Bs_3$, the first magnetic material layer made of the high Bs material ($Bs_1$), and the second magnetic material layer made of the low Bs material ($Bs_2$). In this case, the combination of the magnetic materials is preferable to be the same as the above described embodiment. With this magnetic pole, the magnetic field strength can be further increased and the magnetic field gradient can be steeper.

In the above explained embodiment, the example, in which only the tip portion of the upper magnetic pole 43 is modified into the shape corresponding to the recording track width $W_0$, is described, and the portion 41a of the lower magnetic pole 41 contacting with the magnetic gap 42 can be modified into the same shape, too. In this case, by masking the tip portion of the upper magnetic pole 43 in the lower magnetic pole 41, the portion (41a) can be processed simultaneously with the upper magnetic pole 43 as a mask. With this magnetic pole structure, steepness of recording magnetic field in the track width direction is increased to be further advantageous for recording with the narrowed track.

Incidentally, the lower magnetic pole 41 is also recommended to be composed of the high Bs first magnetic material layer and the low Bs second magnetic material layer. Furthermore, only the portion of the lower magnetic pole 41 contacting with the magnetic gap 42 may be formed with the third magnetic material layer showing a saturated magnetic flux density which is further higher than that of the first magnetic material layer.

Figure 16:
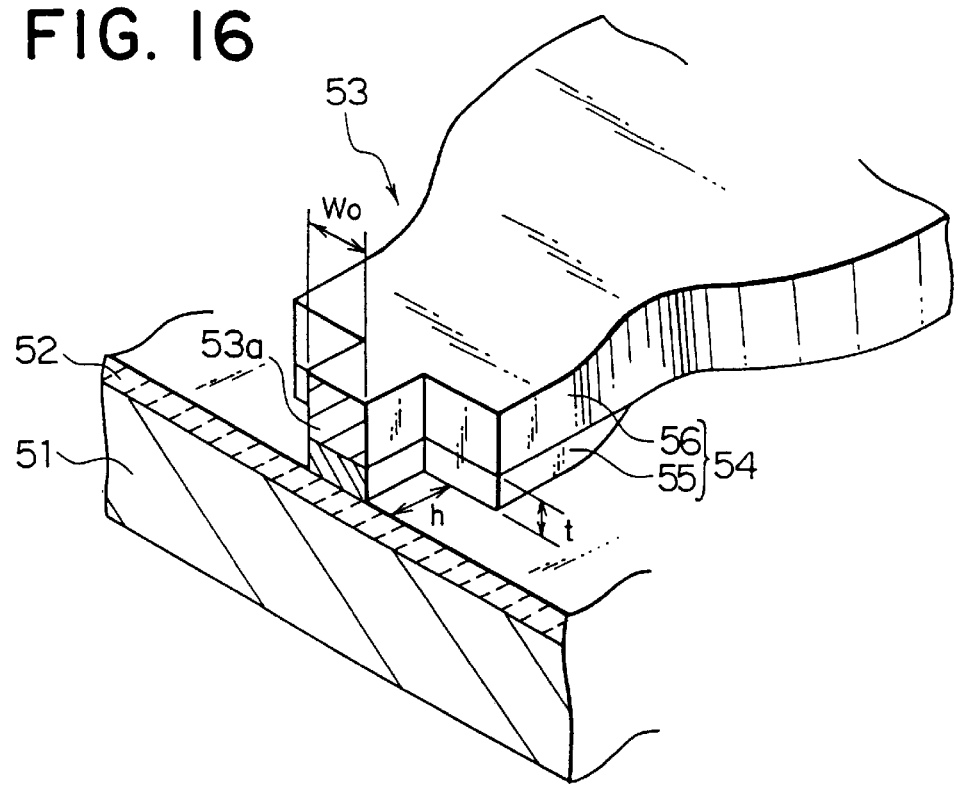
FIG. 16 is a perspective view which shows the structure of the principal portion in an embodiment of a third thin-film magnetic head according to the present invention.

Next, embodiments of a third magnetic head according to the present invention will be described in reference to FIG. 16 and FIG. 17. FIG. 16 is a perspective view which shows the composition of the principal portion in an embodiment of the third magnetic head according to the present invention. FIG. 16 shows only the principal portion of the thin-film magnetic head as a recording head. The whole structure of the thin-film magnetic head in this embodiment, and the whole structure when applying the same to a magnetic recording/reproducing separation head are the same as those in FIG. 1.

The thin-film magnetic head shown in FIG. 16 is provided with a lower magnetic pole (lower recording magnetic pole) 51, a magnetic gap (recording magnetic gap) 52, and an upper magnetic pole (upper recording magnetic pole) 53 as the poles being formed one on the other in this order. The lower magnetic pole 51 and the magnetic gap 52 are made of the same materials as the above explained embodiments.

The upper magnetic pole 53 is composed of a laminated film which includes two or more kinds of magnetic material layers each having a different saturated magnetic flux density. As can be seen from the drawing, the upper magnetic pole 53 has a laminated film 54 containing a first magnetic material layer 55 having the saturated magnetic flux density $Bs_1$ and a second magnetic material layer 56 having the saturated magnetic flux density $Bs_2$ which is lower than the saturated magnetic density $Bs_1$ ($Bs_2<Bs_1$).

It should be understood that the first and the second magnetic material layers 55, 56 can be formed under the same combination of the magnetic materials as those in the above explained embodiments. Furthermore, the high Bs first magnetic material layer 55 can be obtained from a multi-layered film made of various magnetic layers as shown in FIG. 3, or a multi-layered film made of a magnetic layer and a non-magnetic layer as shown in FIG. 4. The combination of the materials for the multi-layered film is also the same as above. The second magnetic material layer 56 can be altered with a multi-layered film.

The proximity of the air bearing surface of the upper magnetic pole 53 composed of the laminated film 54 containing the first magnetic material layer 55 and the second magnetic material layer 56 is provided with a convex portion 53 a having a shape with the width $W_0$ of 1.8 μm or less and the height h in the vertical direction to the ABS of 2 μm or less by means of, for example, the FIB process from the air bearing surface. The ABS is formed by the convex portion 53a.

The convex portion composing the tip portion of the upper magnetic pole 53 has a shape projecting toward the ABS. The first magnetic material layer 55 composing the convex portion 53a contacts with the magnetic gap 52 at the ABS with the track width $W_0$. The height h of the convex portion 53a in the direction of the ABS is 2 μm or less. In the case of that the track width is defined at $W_0$ less than 1.8 μm, if the height h of the convex portion 53a exceeds 2 μm, the recording magnetic field strength extensively decreases.

The thin-film magnetic head in the embodiment is narrowed in the track width $W_0$ of 1.8 μm or less. The tip portion of the thin-film magnetic head is processed by means of the FIB from the air bearing surface to form the tip of the upper magnetic pole 53 into the convex portion 53a, so that the upper magnetic pole 53 corresponding to the recording track width $W_0$ of 1.8 μm or less can be accurately obtained. The convex portion 53a of the upper magnetic pole 53 can be naturally processed by the standard PEP process, in which it is preferable to use a light with a short wavelength for exposure at the time of the PEP to improve the processing accuracy.

The thickness t of the high Bs first magnetic material layer 55 is 0.5 μm or more to make the recording track width $W_0$ correspond to the magnetic head having the narrowed track of 1.8 μm or less. When the recording track width $W_0$ is narrowed to 1.8 μm or less, the magnetic flux extremely concentrates, so that an influence of magnetic saturation becomes great. Therefore, in the third magnetic head according to the present invention, the thickness of the high Bs first magnetic material layer 55 is 0.5 μm or more. Accordingly, preferable recording magnetic field strength and magnetic field gradient can be attained. However, since the thickness of the high Bs first magnetic material layer 55 is considerably thick, the improved effect in magnetic gradient is detracted, so that the thickness of the first magnetic material layer 55 is recommended to be set in less than 20 μm.

Reviewing in the case of the narrowing the recording track width $W_0$ of 1.8 μm or less, by making the thickness t of the high Bs first magnetic material layer 55 of 0.5 μm or more, the magnetic saturation can be controlled at the laminated portion of the first magnetic material layer 55 and the second magnetic material layer 56 in the convex portion 53a corresponding to the track width $W_0$. Accordingly, when the recording track width $W_0$ is set in less than 1.8 μm, preferable recording magnetic field strength and magnetic field gradient can be realized.

As shown in FIG. 6 and FIG. 7, the proximity of the air bearing surface of the upper magnetic pole 53 can be composed of a laminated film including three or more magnetic material layers. Namely, the proximity of the air bearing surface of the upper magnetic pole 53 can be composed of a laminated film which contains the third magnetic material layer having the highest saturated magnetic flux density $Bs_3$, the first magnetic material layer made of the high Bs material ($Bs_1$), and the second magnetic material layer made of the low Bs material ($Bs_2$). In this case, the combination of the magnetic materials is preferable to be the same as the above explained embodiments. With this magnetic pole described above, the magnetic field strength can be further increased and the magnetic field gradient can be steeper.

Figure 17:
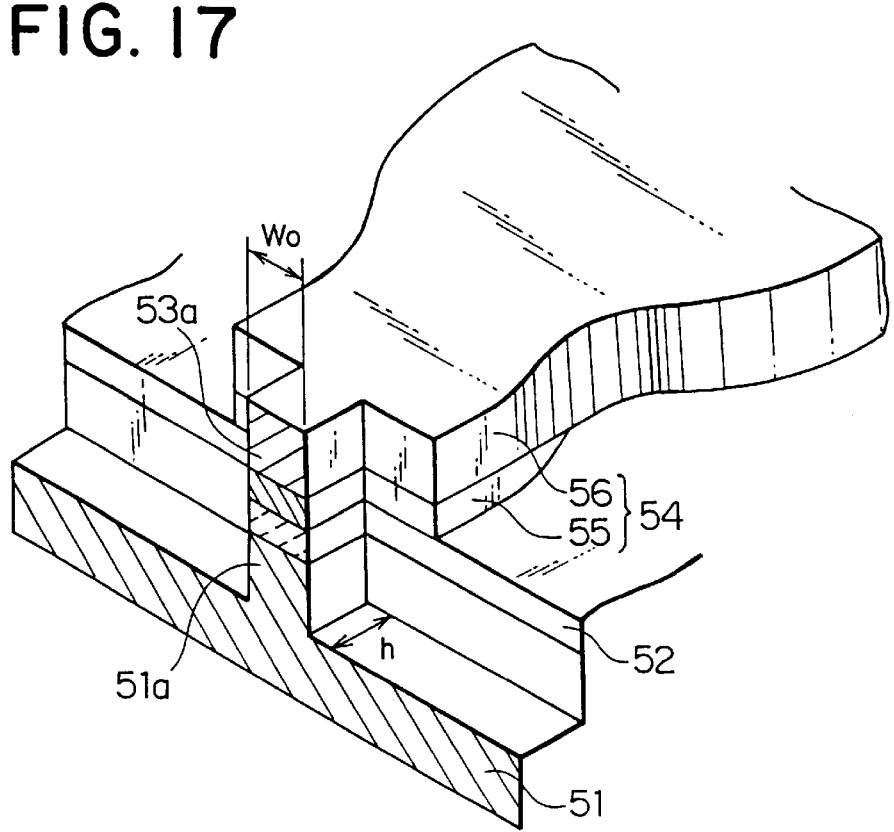
FIG. 17 is a perspective view showing a modification of the thin-film magnetic head shown in FIG. 16.
Figure 18:
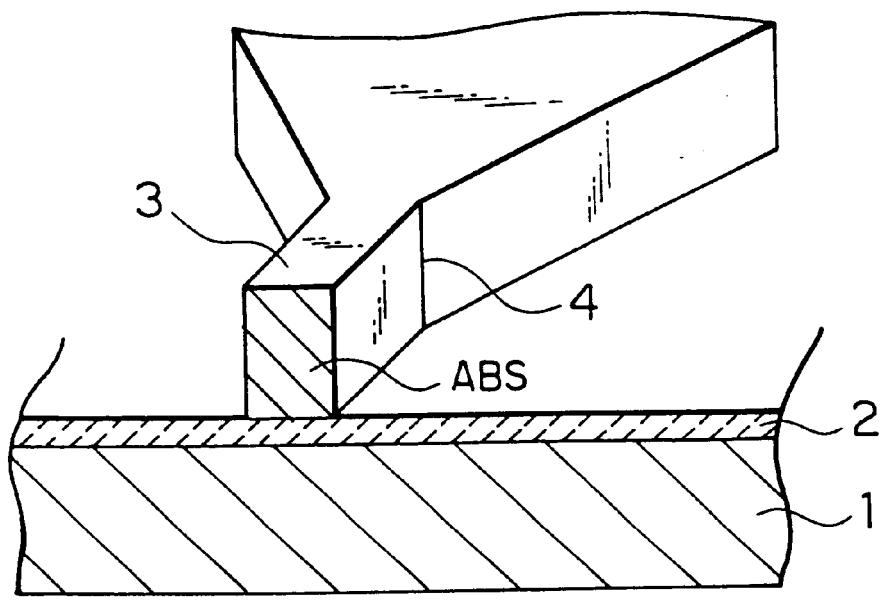
FIG. 18 is a view showing a magnetic pole structure in a conventional and typical thin-film magnetic head.
Figure 19:
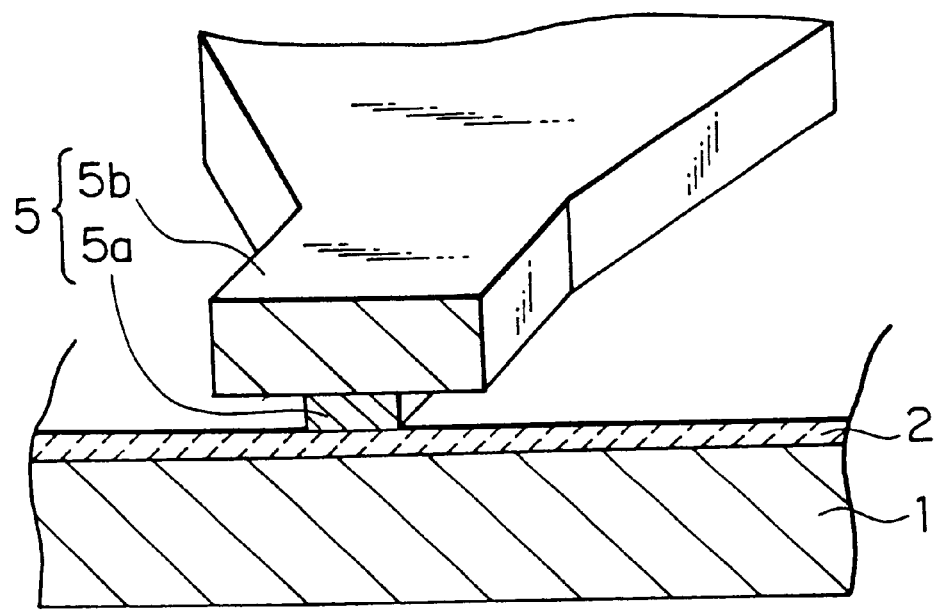
FIG. 19 is a view showing a structure of T-shaped magnetic pole in a conventional thin-film magnetic head.
Figure 20:
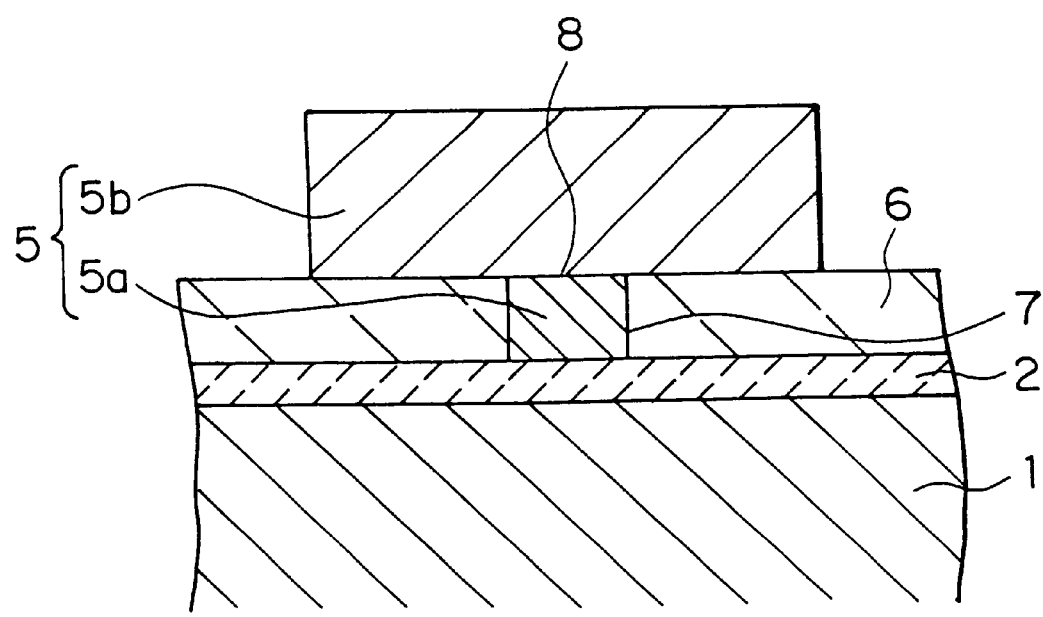
FIG. 20 is a view showing another structure of T-shaped magnetic pole in a conventional thin-film magnetic head.

In the above explained embodiment, the instance, in which only the tip portion of the upper magnetic pole 53 is modified into the convex portion 53a corresponding to the recording track width $W_0$, is described, and, as shown in FIG. 17, the tip of the lower magnetic pole 51 can be modified into the same as the convex portion 51a. In this case, the lower magnetic pole 51 can be processed simultaneously with the upper magnetic pole 53. According to this magnetic pole structure, steepness of recording magnetic field in the track width direction is increased to be further advantageous for recording with the narrowed track.

Incidentally, the lower magnetic pole 51 is also recommended to be composed of the high Bs first magnetic material layer and the low Bs second magnetic material layer. Furthermore, only the portion of the lower magnetic pole 51 contacting with the magnetic gap 52 may be formed with the third magnetic material layer showing a saturated magnetic flux density which is higher than that of the first magnetic material layer.

As has been recognized in the above explained embodiments, according to the magnetic head of the present invention, magnetic saturation can be controlled when narrowing the track width. Consequently, when the track is narrowed, preferable magnetic field strength and magnetic field gradient can be attained. Accordingly, it is possible to provide the magnetic head suitable for high densifying of the magnetic recording density.

What is claimed is:

1. A magnetic head comprising:

a magnetic gap positioned on an air bearing surface;

a pair of magnetic poles positioned to hold said magnetic gap therebetween and at least one of which being composed of a T-shaped magnetic pole having a magnetic pole chip contacting with said magnetic gap and an auxiliary magnetic pole wider than said magnetic pole chip; and a coil positioned between said pair of magnetic poles to intersect said magnetic poles, wherein said T-shaped magnetic pole has a laminated film including two or more kinds of magnetic material layers each having a different saturated magnetic flux density, and a magnetic material layer positioned at a side of said magnetic gap has higher saturated magnetic flux density than the other magnetic material layers, and forms the magnetic pole chip and a portion of the auxiliary magnetic pole close thereto.

2. The magnetic head according to claim 1, wherein the width of a contacting portion of the magnetic pole chip with said magnetic gap is 1.8 μm or less.

3. The magnetic head according to claim 1, wherein said T-shaped magnetic head is provided with a first magnetic material layer having a saturated magnetic flux density $Bs_1$ and composing the magnetic pole chip and the portion of the auxiliary magnetic pole close thereto, and a second magnetic material layer having a saturated magnetic flux density $Bs_2$ which is lower than the saturated magnetic flux density $Bs_1$ and composing the remaining portion of the auxiliary magnetic pole.

4. The magnetic head according to claim 3, wherein said T-shaped magnetic head is further provided with a third magnetic material layer having a saturated magnetic flux density $Bs_3$ which is higher than the saturated magnetic flux density $Bs_1$ and being positioned to contact with said magnetic gap.

5. The magnetic head according to claim 3, wherein the first magnetic material layer and the second magnetic material layer satisfy the relation; $W_1/W_0 \geq Bs_1/Bs_2$, wherein the width of the magnetic pole chip contacting with said magnetic gap is defined as $W_0$, and the width of the contacting portion between the portion and the remaining portion of the auxiliary magnetic pole is defined as $W_1$.

6. The magnetic head according to claim 1, wherein the laminated film contains a multi-layered film made of a magnetic layer and a non-magnetic layer or a multi-layered film made of magnetic layers.

7. The magnetic head according to claim 1, wherein said pair of magnetic poles are respectively formed into the T-shaped magnetic pole.

8. A magnetic head comprising:

a magnetic gap disposed on an air bearing surface;

a pair of magnetic poles disposed to hold the magnetic gap therebetween and at least one of which being composed of a T-shaped magnetic pole having a magnetic pole chip contacting with said magnetic gap and an auxiliary magnetic pole wider than said magnetic pole chip; and a coil disposed between said pair of magnetic poles to intersect the magnetic poles, wherein the T-shaped magnetic pole has a laminated film including a first magnetic material layer and a second magnetic material layer, the first magnetic material layer has a saturated magnetic flux density $Bs_1$ and composes the magnetic pole chip and a portion of the auxiliary magnetic pole close thereto, the second magnetic material layer has a saturated magnetic flux density $Bs_2$ which is lower than the saturated magnetic flux density $Bs_1$ and composes the remaining portion of the auxiliary magnetic pole, and the first magnetic material layer and the second magnetic material layer satisfying the relation; $W_1/W_0 \geq Bs_1/Bs_2$, wherein the width of the magnetic pole chip contacting with said magnetic gap is defined as $W_0$, and the width of the contacting portion between the portion and the remaining portion of the auxiliary magnetic pole is defined as $W_1$.

9. A magnetic head comprising:

a pair of magnetic poles, one of the pair of magnetic poles having a magnetic pole tip and an auxiliary magnetic pole, the magnetic pole tip contacting a magnetic gap at an air bearing surface, the auxiliary magnetic pole having a width in a track width direction wider than a width of the magnetic pole tip in the track width direction and including a first portion contacting with the magnetic pole tip and a second portion disposed apart from the magnetic tip, the one of the pair of magnetic poles having a first layer of a first saturated magnetic flux density and a second layer of a second saturated magnetic flux density which is lower than the first saturated magnetic flux density, the first layer being disposed in the magnetic pole tip and the first portion of the auxiliary magnetic pole, and the second layer being disposed in the second portion of the auxiliary magnetic pole;

the magnetic gap disposed between the pair of the magnetic poles at the air bearing surface; and a coil, a part of the coil being disposed between the pair of magnetic poles.

10. A hard disk drive having a magnetic head, the magnetic head comprising:

a magnetic gap positioned to be situated on an air bearing surface;

a pair of magnetic poles positioned to hold said magnetic gap therebetween and at least one of which being composed of a T-shaped magnetic pole having a magnetic pole chip contacting with said magnetic gap and an auxiliary magnetic pole wider than said magnetic pole chip; and a coil positioned between said pair of magnetic poles to intersect said magnetic poles, wherein said T-shaped magnetic pole has a laminated film including two or more kinds of magnetic material layers each having a different saturated magnetic flux density, and a magnetic material layer which is positioned at a side of said magnetic gap and has high saturated magnetic flux density out of the magnetic material layers in laminated film, forming the magnetic pole chip and a portion of the auxiliary magnetic pole close thereto.

11. A hard disk drive having a magnetic head, the magnetic head comprising:

a magnetic gap disposed on an air bearing surface;

a pair of magnetic poles disposed to hold the magnetic gap therebetween and at least one of which being composed of a T-shaped magnetic pole having a magnetic pole chip contacting with said magnetic gap and an auxiliary magnetic pole wider than said magnetic pole chip; and a coil disposed between said pair of magnetic poles to intersect the magnetic poles, wherein the T-shaped magnetic pole has a laminated film including a first magnetic material layer and a second magnetic material layer, the first magnetic material layer has a saturated magnetic flux density $Bs_1$ and composes the magnetic pole chip and a portion of the auxiliary magnetic pole close thereto, the second magnetic material layer has a saturated magnetic flux density $Bs_2$ which is lower than the saturated magnetic flux density $Bs_1$ and composes the remaining portion of the auxiliary magnetic pole, and the first magnetic material layer and the second magnetic material layer satisfying the relation; $W_1/W_0 \geq Bs_1/Bs_2$, wherein the width of the magnetic pole chip contacting with said magnetic gap is defined as $W_0$, and the width of the contacting portion between the portion and the remaining portion of the auxiliary magnetic pole is defined as $W_1$.

12. A hard disk drive having a magnetic head, the magnetic head comprising:

a pair of magnetic poles, one of the pair of magnetic poles having a magnetic pole tip and an auxiliary magnetic pole, the magnetic pole tip contacting a magnetic gap at an air bearing surface, the auxiliary magnetic pole having a width in a track width direction wider than a width of the magnetic pole tip in the track width direction and including a first portion contacting with the magnetic pole tip and a second portion disposed apart from the magnetic tip, the one of the pair of magnetic poles having a first layer of a first saturated magnetic flux density and a second layer of a second saturated magnetic flux density which is lower than the first saturated magnetic flux density, the first layer being disposed in the magnetic pole tip and the first portion of the auxiliary magnetic pole, and the second layer being disposed in the second portion of the auxiliary magnetic pole;

the magnetic gap disposed between the pair of the magnetic poles at the air bearing surface; and a coil, a part of the coil being disposed between the pair of magnetic poles.

* * * * *